(12) United States Patent
Tsuda et al.

(10) Patent No.: US 10,551,020 B2
(45) Date of Patent: Feb. 4, 2020

(54) VEHICLE LAMP WITH ACOUSTO-OPTIC DEVICE

(71) Applicant: KOITO MANUFACTURING CO., LTD., Tokyo (JP)

(72) Inventors: Toshiaki Tsuda, Shizuoka (JP); Takeshi Masuda, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 104 days.

(21) Appl. No.: 15/304,120

(22) PCT Filed: Apr. 7, 2015

(86) PCT No.: PCT/JP2015/060889
§ 371 (c)(1),
(2) Date: Oct. 14, 2016

(87) PCT Pub. No.: WO2015/159764
PCT Pub. Date: Oct. 22, 2015

(65) Prior Publication Data
US 2017/0030544 A1    Feb. 2, 2017

(30) Foreign Application Priority Data

Apr. 16, 2014    (JP) .................................. 2014-084816

(51) Int. Cl.
*F21S 41/60*    (2018.01)
*G02F 1/11*    (2006.01)
(Continued)

(52) U.S. Cl.
CPC ............ *F21S 41/60* (2018.01); *B60Q 1/0683* (2013.01); *B60Q 1/085* (2013.01); *B60Q 1/143* (2013.01);
(Continued)

(58) Field of Classification Search
CPC ..... G02F 1/11; G02F 1/33; F21S 41/00; F21S 41/645; F21S 41/60; G02B 26/101
(Continued)

(56) References Cited

U.S. PATENT DOCUMENTS 3,514,534 A * 5/1970 Korpel ...................... G02F 1/33
348/198
4,225,938 A * 9/1980 Turpin .................... G06E 3/005
359/285
(Continued)

FOREIGN PATENT DOCUMENTS

JP    55-096475 A    7/1980
JP    2006-085313 A    3/2006
(Continued)

OTHER PUBLICATIONS

International Search Report for PCT/JP2015/060889 dated Jun. 30, 2015 [PCT/ISA/210].
(Continued)

*Primary Examiner* — Zachary W Wilkes
(74) *Attorney, Agent, or Firm* — Sughrue Mion, PLLC (57) ABSTRACT

A vehicle lamp includes a light source that shines a laser beam and a laser scanning unit that has a single or plurality of acousto-optic devices, and the laser scanning unit can control an angle at which a laser beam that is incident on the acousto-optic devices is deflected. The vehicle lamp is strong enough to deal with vibrations and withstands the application to a motor vehicle.

8 Claims, 11 Drawing Sheets

(51) Int. Cl.
*G02F 1/33* (2006.01)
*G02B 26/08* (2006.01)
*F21S 41/25* (2018.01)
*F21S 41/14* (2018.01)
*F21S 41/32* (2018.01)
*G02B 26/10* (2006.01)
*B60Q 1/14* (2006.01)
*F21S 41/125* (2018.01)
*F21S 41/255* (2018.01)
*F21S 41/663* (2018.01)
*B60Q 1/08* (2006.01)
*F21S 41/19* (2018.01)
*F21S 41/16* (2018.01)
*F21S 41/675* (2018.01)
*F21S 41/20* (2018.01)
*B60Q 1/068* (2006.01)
*F21Y 115/30* (2016.01)

(52) U.S. Cl.
CPC ............ *F21S 41/125* (2018.01); *F21S 41/14* (2018.01); *F21S 41/16* (2018.01); *F21S 41/19* (2018.01); *F21S 41/25* (2018.01); *F21S 41/255* (2018.01); *F21S 41/285* (2018.01); *F21S 41/32* (2018.01); *F21S 41/663* (2018.01); *F21S 41/675* (2018.01); *G02B 26/0808* (2013.01); *G02B 26/10* (2013.01); *G02B 26/101* (2013.01); *G02F 1/11* (2013.01); *G02F 1/33* (2013.01); *B60Q 2300/12* (2013.01); *B60Q 2300/142* (2013.01); *F21Y 2115/30* (2016.08)

(58) Field of Classification Search
USPC .......................................... 359/305, 310, 314
See application file for complete search history.

(56) References Cited

U.S. PATENT DOCUMENTS

| 4,477,184 | A | | 10/1984 | Endo |
| 5,086,341 | A | * | 2/1992 | Tamada ................... G02F 1/33 |
| | | | | 348/198 |
| 5,105,304 | A | * | 4/1992 | Tanaka ..................... G02F 1/11 |
| | | | | 348/769 |
| 5,644,141 | A | | 7/1997 | Hooker et al. |
| 6,555,781 | B2 | * | 4/2003 | Ngoi .................... B08B 7/0042 |
| | | | | 219/121.67 |
| 8,559,085 | B2 | * | 10/2013 | Maak ....................... G02F 1/33 |
| | | | | 359/198.1 |
| 2005/0128751 | A1 | | 6/2005 | Roberge et al. |
| 2013/0058114 | A1 | * | 3/2013 | Reiners .................. F21S 41/16 |
| | | | | 362/510 |
| 2014/0029282 | A1 | | 1/2014 | Ravier et al. |
| 2014/0254188 | A1 | | 9/2014 | Masuda et al. |

FOREIGN PATENT DOCUMENTS

| JP | 2013-125693 A | 6/2013 |
| JP | 2013-134887 A | 7/2013 |
| WO | 2004/100624 A2 | 11/2004 |

OTHER PUBLICATIONS

Communication dated Nov. 2, 2017, from the European Patent Office in counterpart European Application No. 15779843.0.
Office Action dated Apr. 26, 2018 by the State Intellectual Property Office of P.R. China in counterpart Chinese Patent Application No. 201580019847.7.
Communication dated Mar. 27, 2018 issued by the Japanese Patent Office in counterpart Japanese Patent Application No. 2014-084816.
Written Opinion for PCT/JP2015/060889 dated Jun. 30, 2015, 9 pages in English and Japanese.
Office Action dated Apr. 26, 2018 by the State Intellectual Property Office of P.R. China in counterpart Chinese Patent Application No. 201580019847.7, 14 pages in English and Chinese.

* cited by examiner

VEHICLE LAMP WITH ACOUSTO-OPTIC DEVICE

This application is a National Stage of International Application No. PCT/JP2015/060889 filed Apr. 7, 2015, claiming priority based on Japanese Patent Application No. 2014-084816, filed Apr. 16, 2014, the contents of all of which are incorporated herein by reference in their entirety.

TECHNICAL FIELD

The present invention relates to a vehicle lamp and more particularly to a vehicle lamp including a laser scanning unit.

BACKGROUND ART

Recently, vehicle lamps equipped with a laser scanning unit are known. In a laser scanning unit of a mechanical-optical system described in Japan Patent Publication No. 2013-125693, a laser beam is scanned using a laser scanning unit such as an MEMS (Micro Electro Mechanical Systems) mirror, a galvano-mirror or the like, so that a mark denoting a road sign is shone on to a road surface or the like.

SUMMARY OF THE INVENTION

However, in the laser scanning unit of a mechanical-optical system described in Japan Patent Publication No. 2013-125693, a mechanical element becomes mandatory which oscillates an optical system vertically and horizontally. However, since a motor vehicle is subjected to vibrations at all times, there are fears that resonance is generated in the optical system of the laser scanning unit of the mechanical-optical system, this representing a problem in mounting the laser scanning unit on the motor vehicle.

The present invention has been made in view of the problem inherent in the prior art, and an object of the present invention is to provide a vehicle lamp including a laser scanning unit that is strong enough to deal with vibrations and which withstands the application to a motor vehicle.

With a view to achieving the object, according to the present invention, there is provided a vehicle lamp including a light source that shines a laser beam and a laser canning unit having a single or a plurality of acousto-optic devices, wherein the laser scanning unit can control an angle at which a laser beam incident on the acousto-optic device is deflected.

The acousto-optic device deflects incident light by generating a periodic change in refraction index in a highly anisotropic medium by applying an ultrasonic sound wave to the medium. Namely, by using the acousto-optic device as the laser scanning unit, the shining angle of the emitted laser beam can be controlled arbitrarily only by controlling an electric signal that is inputted into the acousto-optic device, and therefore, the vehicle lamp is obtained which is highly reliable in dealing with vibrations and impacts of a motor vehicle.

It is possible to provide the vehicle lamp that includes the laser scanning unit that withstands the application to a motor vehicle.

DETAILED DESCRIPTION OF EMBODIMENTS

Figure 1:
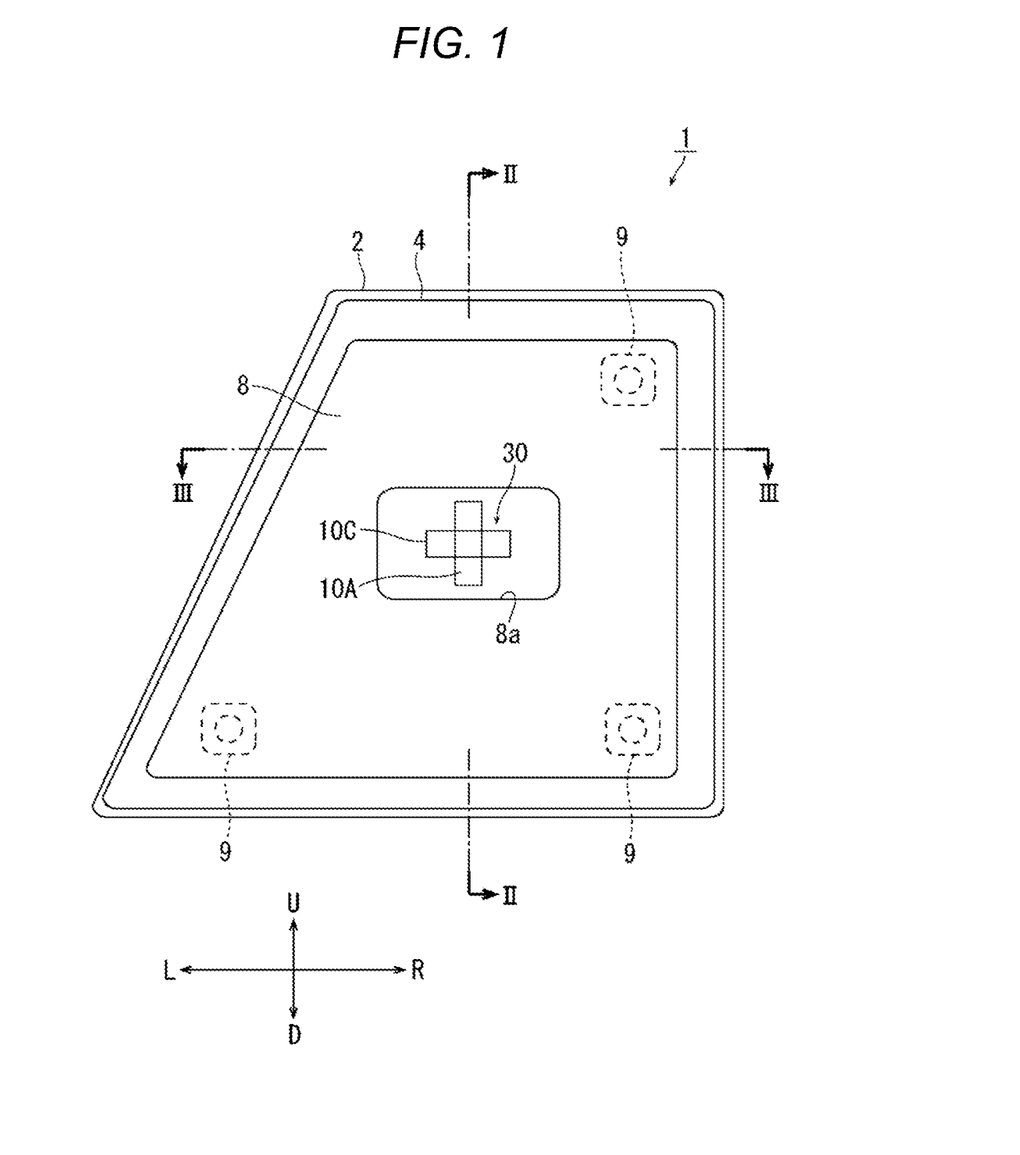
FIG. 1 is a front view of a vehicle lamp according to a first embodiment of the present invention.
Figure 2:
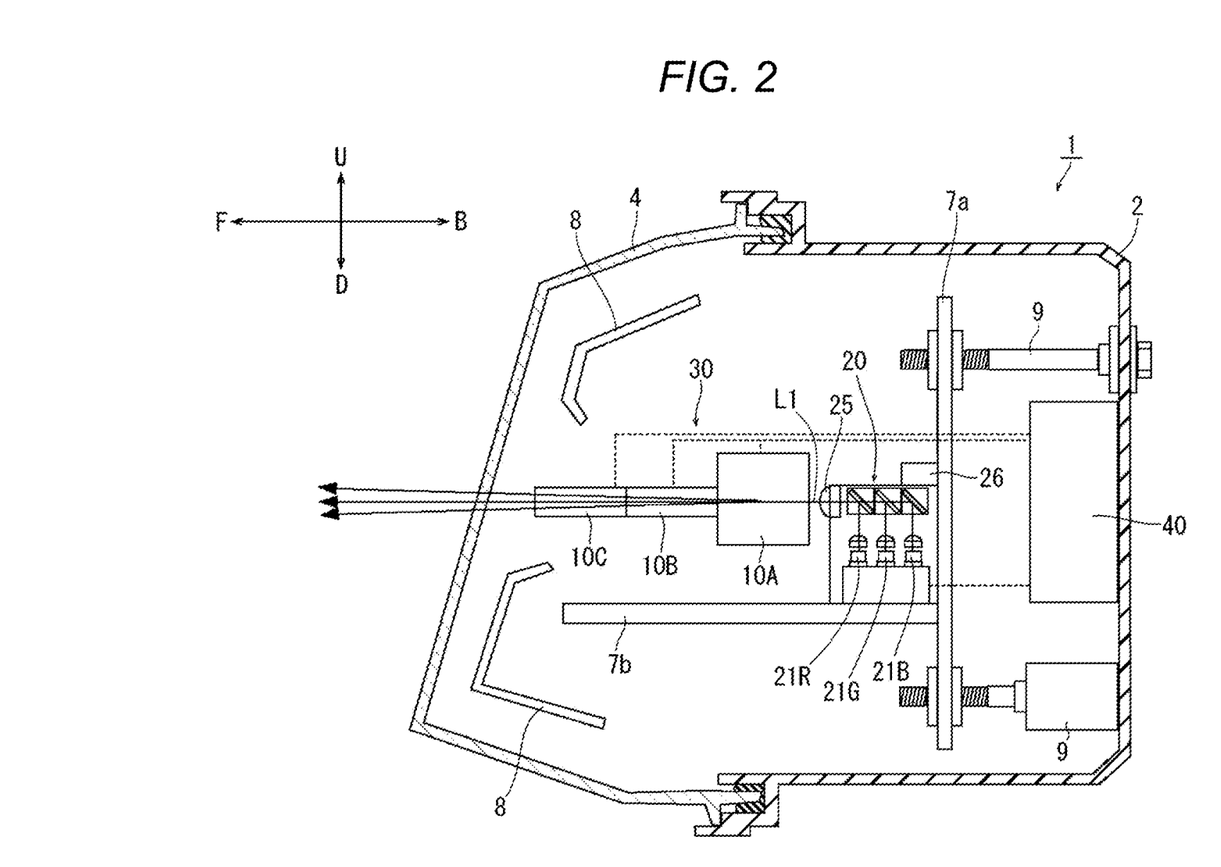
FIG. 2 is a vertical sectional view of the vehicle lamp.
Figure 3:
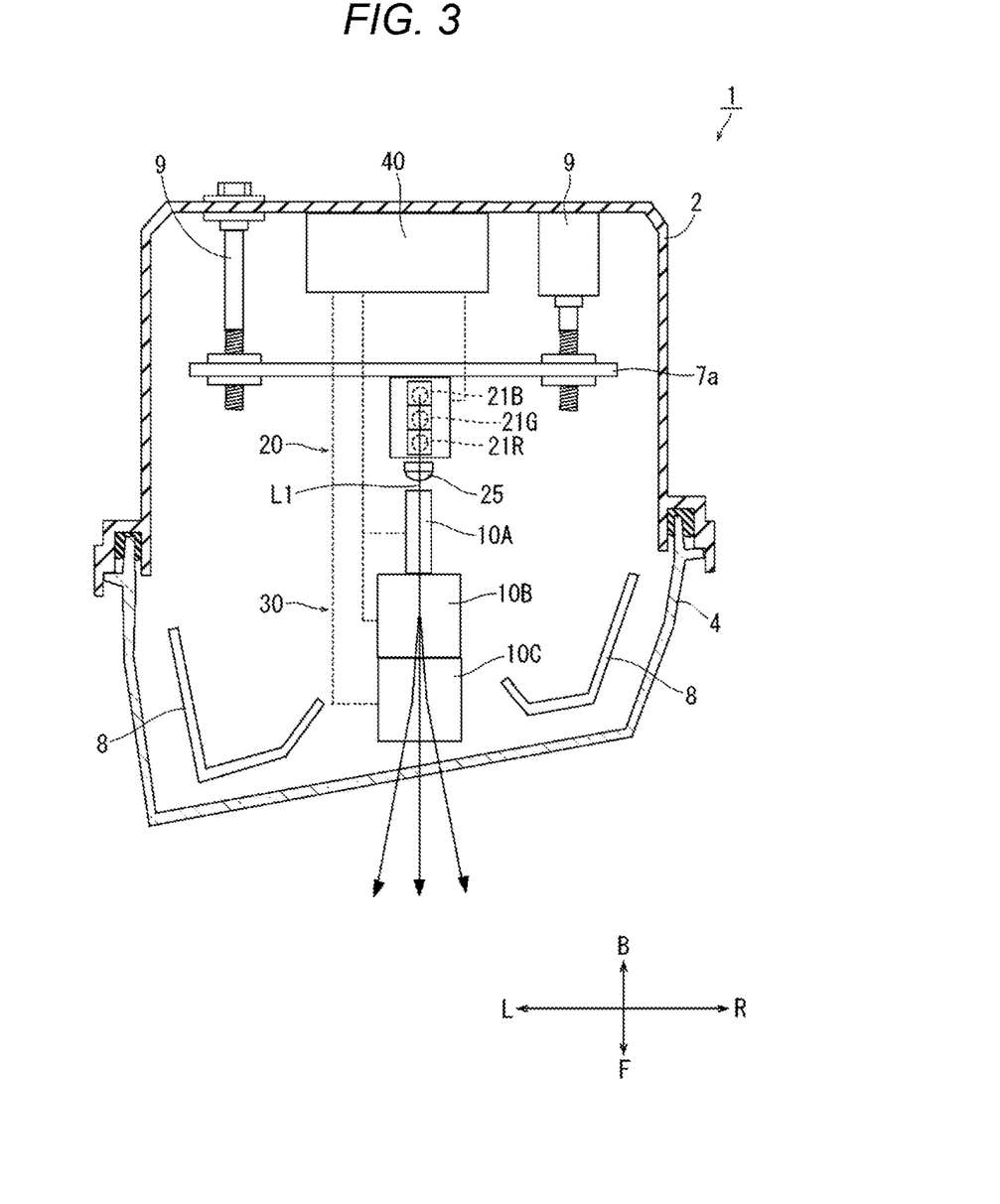
FIG. 3 is a horizontal sectional view of the vehicle lamp.

Next, preferred embodiments of the present invention will be described by reference to the drawings.
(First Embodiment)
FIG. 1 is a front view of a vehicle lamp according to a first embodiment of the present invention, FIG. 2 is a vertical sectional view (a sectional view taken along a line II-II in FIG. 1) of the vehicle lamp, and FIG. 3 is a horizontal sectional view (a sectional view taken along a line III-III in FIG. 1) of the vehicle lamp.

A vehicle lamp 1 shown in the figures represents a headlamp that is provided either on the left or right of a front portion of a vehicle. The vehicle lamp 1 has a lamp compartment that is defined by a box-shaped lamp body 2 having an opening portion and a front cover 4 that is formed of transparent resin or glass for attachment to the opening portion. In the figures, an arrow F denotes the front of the lamp, an arrow B denotes the rear of the lamp, an arrow L denotes the left of the lamp, an arrow R denotes the right of the lamp, an arrow U denotes the top of the lamp, and an arrow D denotes the bottom of the lamp. Arrows with no reference character denote traveling directions of rays of light.

The vehicle lamp 1 (or the lamp compartment thereof) has, as will be described later, a light source unit 20 that shines a laser beam, a laser scanning unit 30 having a first acousto-optic device that scans a laser beam from the light source in one direction of a destination of a laser beam shone from the light source and a second acousto-optic device that scans a laser beam from the light source in the other direction that intersects the one direction at right angles, and a control unit 40. In addition to these constituent parts, a vertical bracket 7a and a horizontal bracket 7b are provided in the lamp compartment of the vehicle lamp 1 as support members that support the light source unit 20 and the laser scanning unit 30. An extension 8, which acts as a concealing member, is provided at a front portion within the lamp compartment of the vehicle lamp 1, and this extension 8 has an opening portion 8a that permits light emerging from the laser scanning unit 30 to travel to the front of the lamp.

The vertical bracket 7a and the horizontal bracket 7b are formed of a metal having a high thermal conductivity such as aluminum so that heat generated by the light source unit 20 is dissipated with good efficiency. The vertical bracket 7a is fixed to the lamp body 2 at three locations of its corner portions with aiming screws 9. The horizontal bracket 7b is fixed to a front surface of the vertical bracket 7a. In the vehicle lamp 1, optical axes of the light source unit 20 and the laser scanning unit 30 can be adjusted vertically and horizontally by adjusting the posture of the vertical bracket 7a by rotating the aiming screws 9.

The light source unit 20 is a so-called RGB laser unit and has a first light source 21R that is a red laser diode, a second light source 21G that is a green laser diode, a third light source 21B that is a blue laser diode, substrates for these light sources, lenses that make light emitted from the light sources 21R, 21G, 21B into parallel light for collection to corresponding dichroic mirrors, the dichroic mirrors that reflect the light from the lenses in the direction of a collective lens 25 that is provided in a casing of the light source unit 20, and the collective lens 25 that collects the reflected light from the dichroic mirrors for emission from the light source unit 20. FIGS. 2 and 3 show an interior of the casing of the light source unit 20 as viewed through the casing. In addition to the constituent parts described, the light source unit 20 has a monitoring unit 26 that controls the outputs of the light sources 21R, 21G, 21B so as to monitor the illumination strength of each of the laser beams and the illumination strength of combined light. The light source unit 20 is fixed to the vertical bracket 7a and the horizontal bracket 7b so that the collective lens 25 is positioned at the front of the casing.

The laser scanning unit 30 has a plurality of acousto-optic devices (hereinafter, referred to as AO device) 10A, 10B, 10C. Since the AO devices 10A, 10B, 10C have the same configuration, the configuration thereof will be described as the configuration of an AO device 10 that generally represents the AO devices 10A, 10B, 10C.

Figure 4:
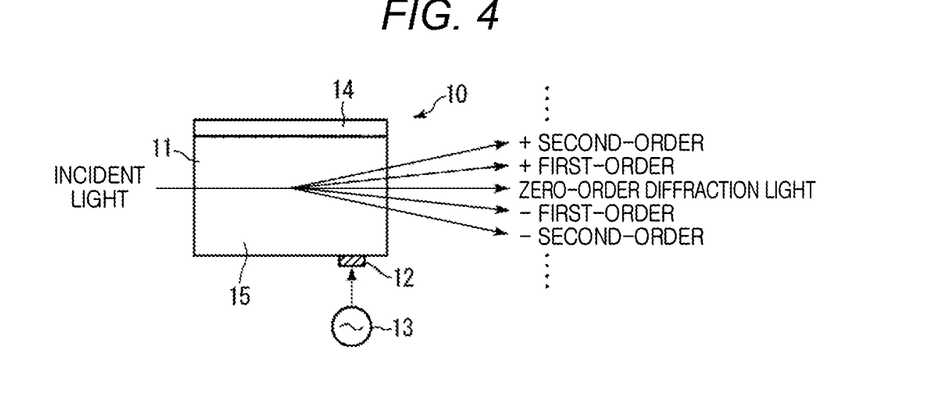
FIG. 4 is a diagram showing the configuration of an AO device.

FIG. 4 is a diagram showing the configuration of the AO device 10. FIG. 4 is a plan view of the AO device 10. The AO device (Acousto-optic device) 10 is made in such a way that a piezoelectric device 12 is bonded to an acousto-optic medium 11 that is formed of a single crystal such as tellurium dioxide (TeO2) or molybdate (PbMoO4), for example, and an acoustic absorbing material 14 is bonded to an opposite side of the acousto-optic medium 11 to the side where the piezoelectric device 12 is bonded. When an electric signal is applied to the piezoelectric device 12 from an alternating current oscillator 13, an ultrasonic sound wave is propagated to the interior of the acousto-optic medium 11. Then, when a laser beam is transmitted through the acousto-optic medium 11 where the ultrasonic sound wave is propagated, the laser beam causes an anisotropic Bragg diffraction by making use of the anisotropy of the acousto-optic medium 11 and is then divided into diffraction light ranging about zero-order diffraction light into first-order, second-order, . . . , x-order diffraction light on one side and -first-order, -second-order, . . . , -x-order diffraction light on the other side. Namely, the AO device can deflect the laser beam in relation to time by controlling the waveform of an impressed voltage and scan the laser beam arbitrarily in one direction of a destination of the laser beam shone.

The laser scanning unit 30 has the first AO device 10A, the second AO device 10B and the second AO device 10C. The first AO device 10A, the second AO device 10B and the second AO device 10C are disposed in series in the order of the first AO device 10A, the second AO device 10B and the second AO device 10C on an optical path L1 of the laser beam emitted from the light source unit 20.

The first AO device 10A is disposed vertical to the acousto-optic medium 11 so that diffraction light of a laser beam incident thereon is diffused in the vertical direction (the U-D direction in FIG. 2). The second AO device 10B and the second AO device 10C are disposed in such a state that the first AO device 10A is rotated through 90 degrees relative to the laser optical path L1. Namely, the second AO devices 10B, 10C are disposed in such a state that the acousto-optic media 11 thereof lie horizontal so that diffraction light of a laser beam incident thereof is diffused in the horizontal direction (the L-R direction in FIG. 3). The first AO device 10A, the second OA device 10B and the second AO device 10C are fixed to the horizontal bracket 7a via predetermined support members.

A laser beam that is incident on the first AO device 10A from the light source unit 20 is scanned in the vertical direction by the first AO device 10A and is incident on the second AO device 10B. The laser beam that is incident on the second AO device 10B from the first AO device 10A is scanned in the horizontal direction by the second AO device 10B and is incident on the second AO device 10C. The laser beam incident on the second AO device 10C from the second AO device 10B is scanned in the horizontal direction by the second AO device 10C and is emitted to the front of the vehicle. Namely, the laser beam from the light source unit 20 is diffused in the vertical direction by the first AO device 10A, the laser beam so diffused is then diffused two-dimensionally by the second AO device 10B, and the shining angle of the laser beam so diffused is then expanded further in the horizontal direction by the second AO device 10C, the laser beam eventually being emitted to the front of the vehicle.

Figure 5:
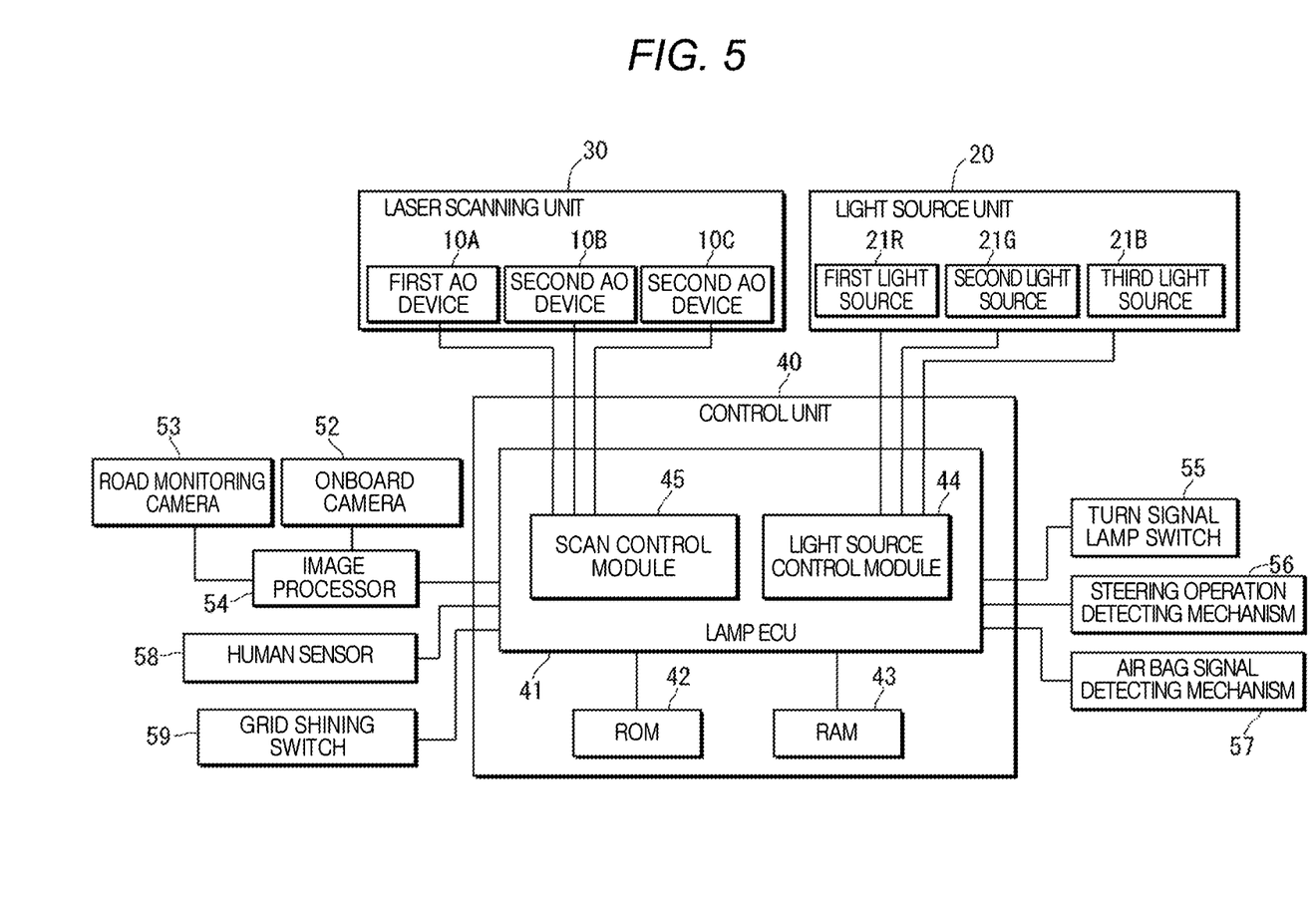
FIG. 5 is a block diagram depicting a control unit.

Next, referring to FIG. 5, the control unit 40 will be described. FIG. 5 is a block diagram illustrating the control unit. The control unit 40 is fixed to the lamp body 2, for example. The control unit 40 has a lamp ECU (Electronic Control Unit) 41, a ROM 42 and a RAM 43. The lamp ECU 41 has a light source control module 44 for controlling the light source unit 20 and a scan control module 45 for controlling the laser scanning unit 30. Various control programs are recorded in the ROM 42, and the lamp ECU 41 executes the control programs recorded in the ROM 42 in the RAM 43 to thereby generate various control signals. The light source control module 44 controls independently the illumination strengths of laser beams (R, G, B) emitted by the first light source 21R, the second light source 21G and the third light source 21B and the tuning on and off of the individual light sources. The scan control module 45 controls independently and individually frequencies oscillated by the alternating current oscillator 13 that is connected to the individual AO devices 10A, 10B and 10C.

In addition, an image processor 54, a turn signal lamp switch 55, a steering operation detecting mechanism 56, an air bag signal detecting mechanism 57, a human sensor 58 and a grid shining switch 59 are connected to the lamp ECU 41. An onboard camera 52 and a road monitoring camera 53 are connected to the image processor 54. The onboard camera 52 includes a camera that is mounted on the subject vehicle or other vehicle to image the periphery of the vehicle in the form of a motion or still picture. The road monitoring camera 53 includes an intersection camera that is placed at an intersection and a monitoring camera that is placed in the vicinity of a road for imaging a road surface condition, a pedestrian, a vehicle such as a bicycle, a motorbike and a motor vehicle, an obstacle and the like in the form of a motion or still picture. The image processor 54 is connected to the road monitoring camera 53 via a communication line such as the Internet to obtain an image and image data picked up by the road monitoring camera 53. The image processor 54 images and the like that are picked up by the onboard camera 52 and the road monitoring camera 53 to the lamp ECU 41 as analyzed data. The control unit 40 also monitors whether or not the illumination strengths of the light sources 21R, 21G, 21B of the light source unit 20 are normal.

Referring to FIGS. 6A to 6D, light distribution patterns or shining patterns that can be formed by the vehicle lamp 1 configured as described above will be described.

Figure 6A:
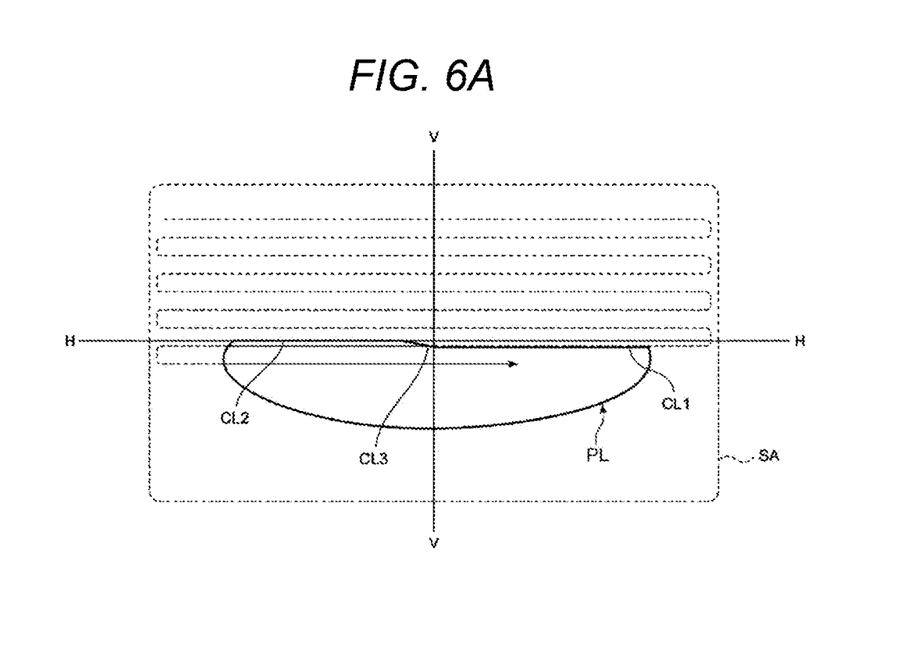
FIG. 6A shows an example of a headlamp light distribution pattern according to the first embodiment.

FIG. 6A shows an example of a headlamp light distribution pattern. FIG. 6 is intended to illustrate a headlamp function of the vehicle lamp 1 and shows light distribution patterns that would be formed on an imaginary vertical screen set up in a position lying 25 meters ahead of the vehicle. The laser scanning unit 30 of the vehicle lamp 1 that is made up of the AO devices 10A, 10B and 10C can scan within a rectangular scanning area SA. The scanning area SA of the laser scanning unit 30 is a range that is defined, for example, by an upper end lying 10 degrees above an H-H line, a lower end lying 10 degrees below (−10 degrees) the H-H line, and left and right ends lying 10 degrees leftwards and rightwards (±10 degrees) of a V-V line and is set wider than an area where a low beam light distribution pattern PL is formed and an area where a high beam light distribution pattern PH is formed. The detailed shapes of the low beam light distribution pattern PL and the high beam light distribution pattern PH are known, and the description thereof will be omitted here.

Specifically, as shown in FIG. 6A, in the case of the low beam light distribution pattern PL being formed, when the scanning position of the laser scanning unit 30 lies within the low beam light distribution pattern PL, the control unit 40 combines respective laser beams of the first light source 21R, the second light source 21G and the third light source 21B of the light source unit 20 to thereby emit a white laser beam. When the scanning position of the laser scanning unit 30 lies out of the low beam light distribution pattern PL, the control unit 40 stops the respective light sources 21R, 21G, 21B of the light source unit 20 from outputting laser beams. As a result of this, a low beam light distribution pattern PL is formed which has an oncoming vehicle's side cut-off line CL1, a subject vehicle's side cut-off line CL2 and an oblique cut-off line CL3.

Although an illustration is omitted, this will be true with the formation of the high beam light distribution pattern PH. When the scanning position of the laser scanning unit 30 lies within the high beam light distribution pattern PH, the control unit 40 combines the respective laser beams of the light sources of the light source unit 20 to emit a white laser beam, while when the scanning position of the laser scanning unit 30 lies out of the high beam light distribution pattern PH, the control unit 40 stops the output of the light source unit 20. When forming the high beam light distribution pattern PH, the control unit 40 strengthens the respective illumination strengths of the light sources 21R, 21G, 21B so as to be stronger than those when the low beam light distribution pattern PL is formed. The control unit 40 slows the scanning speed according to a designed luminous intensity of a hot zone.

Figure 6B:
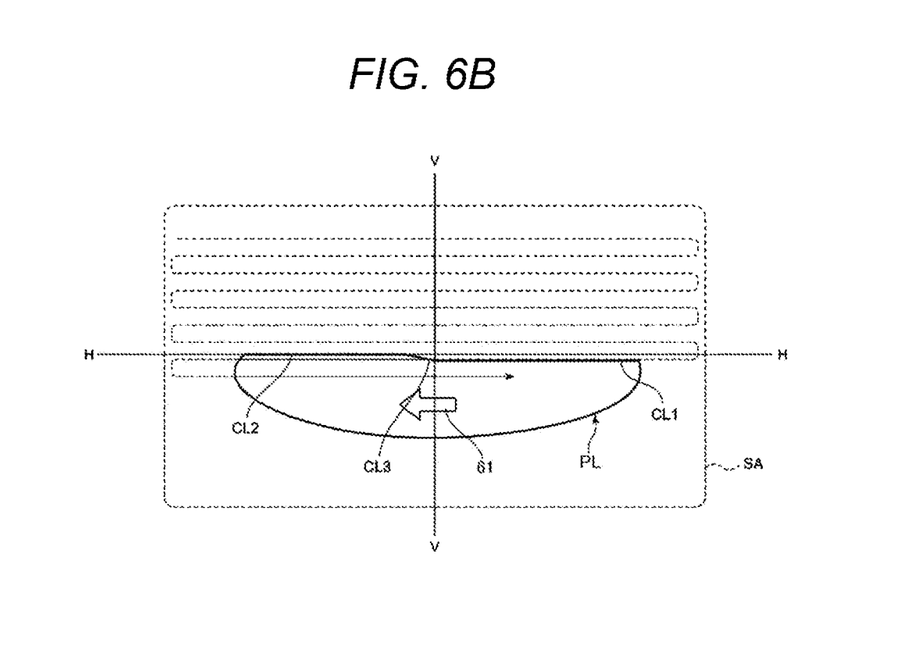
FIG. 6B shows an example in which a turning mark is shone on to the road surface.
Figure 6C:
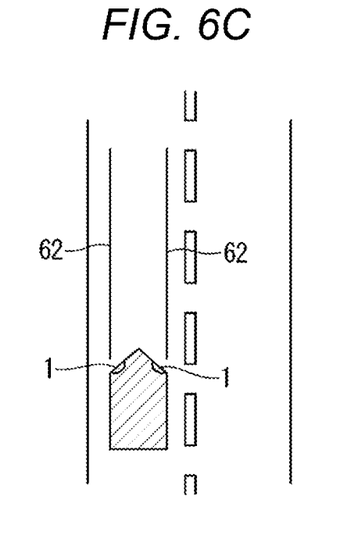
FIG. 6C shows an example in which vehicle's width lines are shone on to the road surface.
Figure 6D:
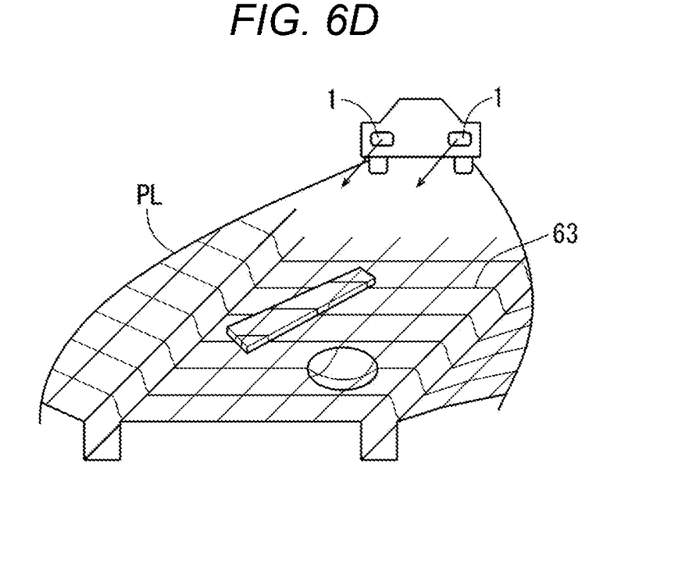
FIG. 6D shows an example in which a driving assist grid of lines is shown on to the road surface.

FIGS. 6B to 6D show examples road surface shining light distribution patterns and illustrate a road surface shining function of the vehicle lamp 1. FIG. 6B shows an example in which a turning mark is shone on to the road surface, FIG. 6C shows an example in which vehicle's width lines are shone on to the road surface, and FIG. 6D shows an example in which a driving assist grid lines are shone on to the road surface. The road surface shining function is a function to project a figure, symbol or character on to the road surface or a structure on the periphery of the vehicle.

In FIG. 6B, a turning mark 61 that indicates a left turn is drawn or shone in orange within the low beam light distribution pattern PL. In this case, the control unit 40 receives a signal from the turn signal lamp switch 55 or the steering operation detecting mechanism 56 at the lamp ECU 41 and controls so that the turning mark 61 is shone on to a predetermined position within the low beam light distribution pattern PL. Specifically, when the scanning position of the laser scanning unit 30 lies within the low beam light distribution pattern PL, the control unit 40 combines the laser beams of the respective light sources of the light source unit 20 to emit the white laser beam, while when the scanning position of the laser scanning unit 30 lies within the area where the turning mark 61 is to be formed, the control unit 40 combines the laser beams of the first light source 21R and the second light source 21G of the light source unit 20 to emit an orange laser beam. When the scanning position of the laser scanning unit 30 lies in neither of the areas described above, the control unit 40 stops the output of the light source unit 20.

In FIG. 6C, lines 62 indicating the vehicle's width are shone with white color onto a subject vehicle's driving lane. In this case, the control unit 40 controls so that the lines 62 that define therebetween a width that corresponds to the vehicle's width are shone on to the road surface in a traveling direction of the vehicle based on information regarding the width of the vehicle that is stored in the ROM 42 in advance. Specifically, when the scanning position of the laser scanning unit 30 lies within an area where the lines 62 are to be shone, the control unit 40 combines the respective laser beams of the light sources of the light source unit 20 to emit a white laser beam, whereas when the scanning position of the laser scanning unit 30 lies out of the area where the lines 62 are to be shone, the control unit 40 stops the output of the light source unit 20.

In FIG. 6D, driving assist grid lines 63 are shone in blue within a low beam light distribution pattern PL. In this case, the control unit 40 receives a signal from the grid shining switch 59 disposed to, for example, driver's seat at the lamp ECU 41 and controls so that the grid lines 63 are shone within the low beam light distribution pattern PL. When the scanning position of the laser scanning unit 30 lies within the low beam light distribution pattern PL, the control unit 40 combines the respective laser beams of the light sources of the light source unit 20 so as to emit a white laser beam. On the other hand, when the scanning position of the laser scanning unit 30 lies within an area where the grid lines 63 are to be formed, the control unit 40 controls the light source unit 20 so as to emit a blue laser beam from the third light source 21B. When the scanning position of the laser scanning unit 30 lies in neither of the two areas described above, the control unit 40 stops the output of the light source unit 20.

The turning mark 61, the lines 62 and the grid lines 63 represent the examples of the road surface shining light distribution patterns. In addition, the road surface shining light distribution patterns can also be formed when the low beam light distribution pattern PL (or the high beam light distribution pattern PH) is illuminated or is not illuminated and hence can be used in parallel with the headlamp light distribution patterns. In the event that turning mark 61, the lines 62 and the grid lines 63 are shone on to the road surface when the low beam light distribution pattern PL (or the high beam light distribution pattern PH) is illuminated, a dark portion is formed so as to surround an outline of the figure shone to thereby make the figure conspicuous. When describing this specifically by taking, for example, although the laser scanning unit 30 is scanned with the illumination strengths of the respective light sources 21R, 21G, 21B of the light source unit 20 made equal to one another at a time corresponding to a location where the low beam light distribution pattern PL is formed, at a time corresponding to a location where the grid lines 63 are wanted to be shone, the dark portion can be formed by strengthening the output of the third light source 21B more than those of the other color light sources by reducing or stopping the outputs of the other color light sources.

The shining patterns described above represent the examples, and according to the vehicle lamp 1 of the first embodiment, a shining pattern in an arbitrary color can be shone in an arbitrary position within the scanning area SA that is projected ahead of the vehicle by combining together the turning on and off of the light source unit 20 that outputs RBB laser beams and the two-dimensional illumination by the laser scanning unit 30. Then, since the AO devices 10A, 10B, 10C are used as the laser scanning unit 30, the shining angle of laser beams can be controlled arbitrarily at high speeds using electric signals that are inputted into the respective AO devices 10A, 10B, 10C. Thus, even through vibrations and impacts are generated by a motor vehicle on which the vehicle lamp 1 is mounted, the shining angle of laser beams can be maintained accurately. In addition, the laser beams from the light source unit 20 are oscillated periodically in the first AO device 10A, the second AO device 10B and the second AO device 10C so as to change optical path lengths thereof, and therefore, speckle noise is suppressed in the vehicle lamp 1 in an ensured fashion.
(Second Embodiment)

Figure 7:
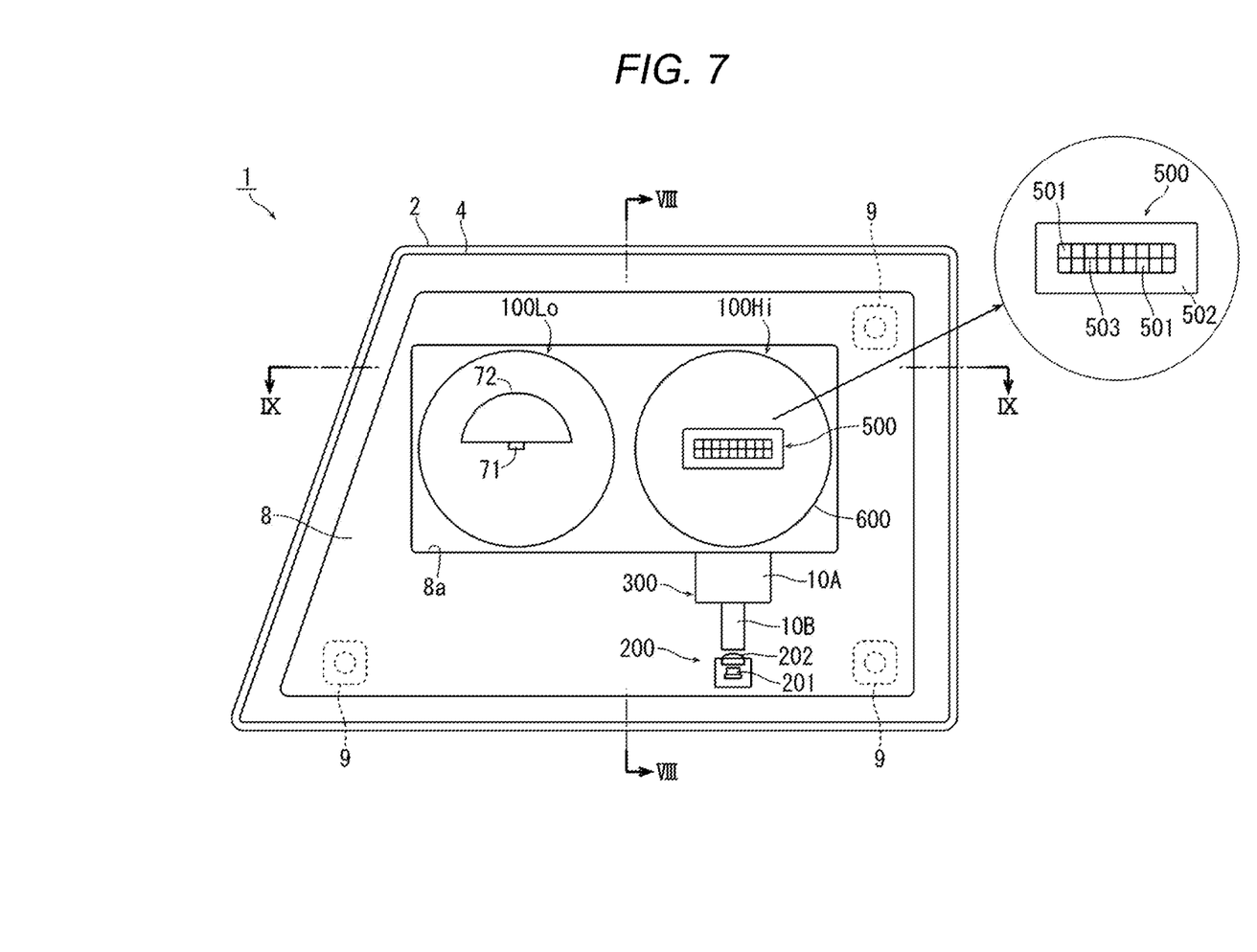
FIG. 7 is a front view of a vehicle lamp according to a second embodiment of the present invention.
Figure 8:
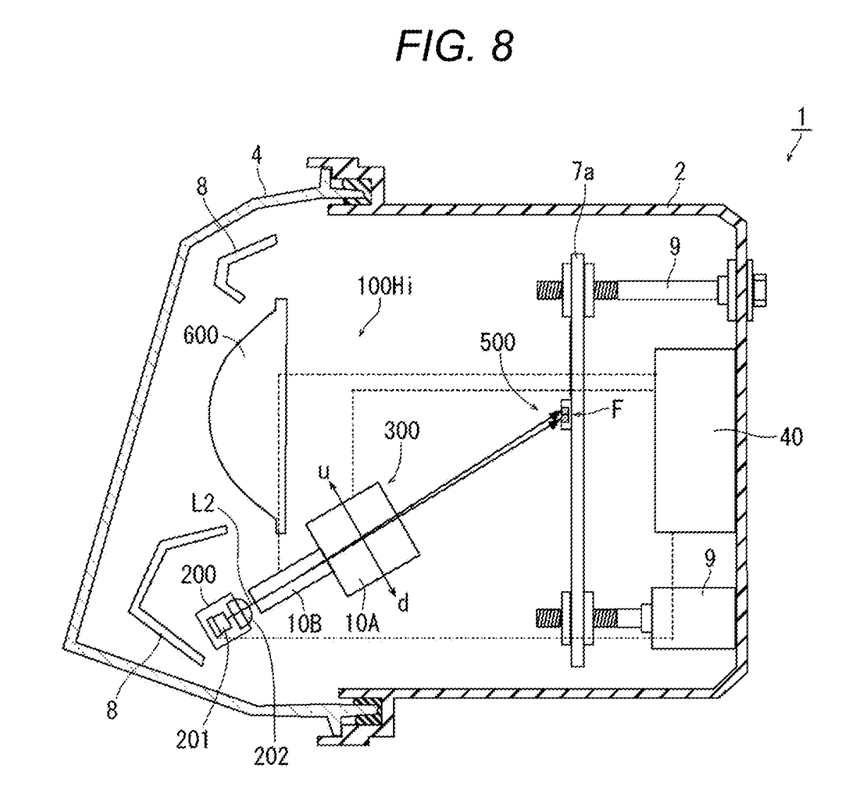
FIG. 8 is a vertical sectional view of the vehicle lamp.
Figure 9:
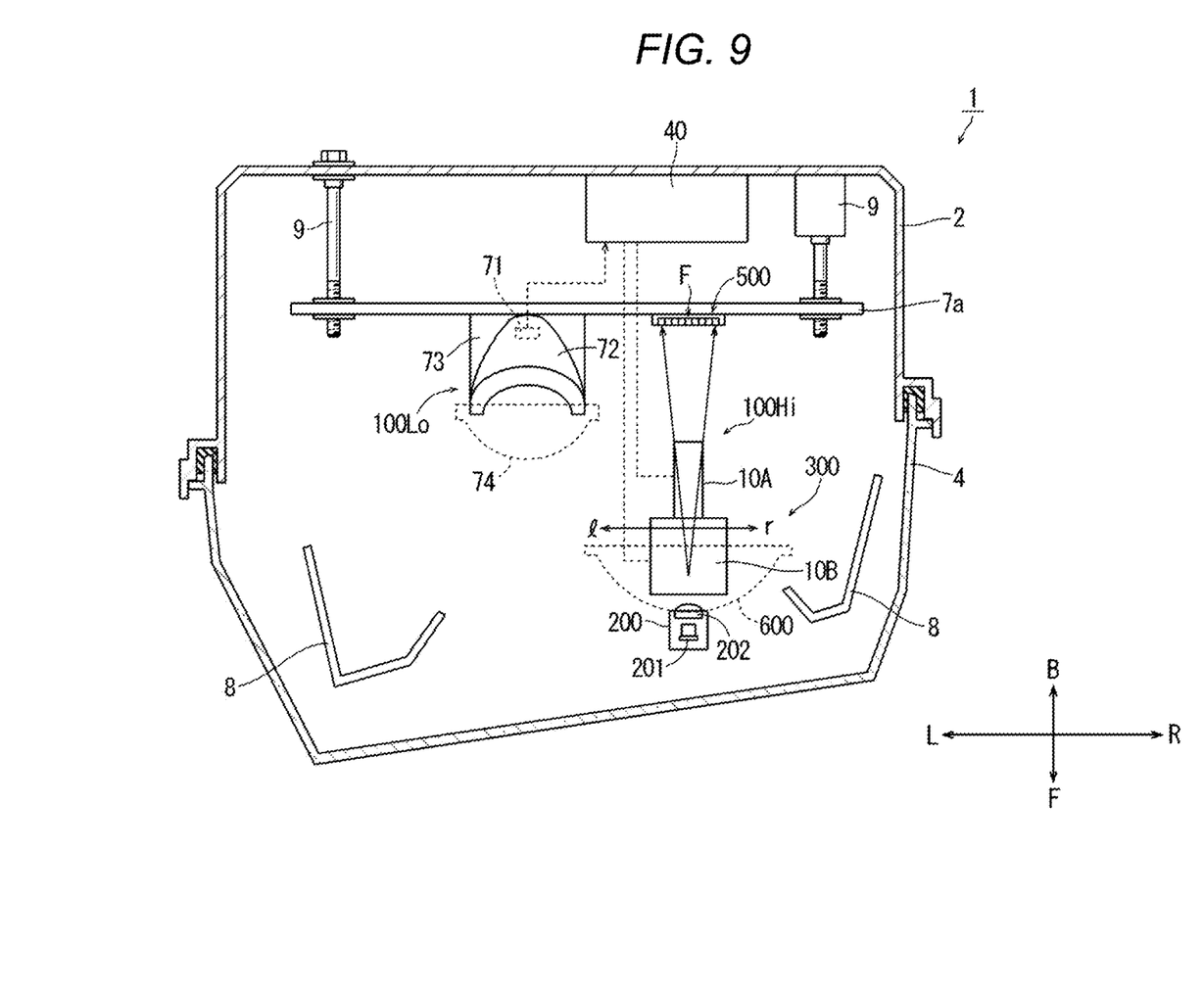
FIG. 9 is a horizontal sectional view of the vehicle lamp.

FIG. 7 is a front view of a vehicle lamp according to a second embodiment, FIG. 8 is a vertical sectional view (a sectional view taken along a line VIII-VIII in FIG. 7) of the vehicle lamp, and FIG. 9 is a horizontal sectional view (a sectional view taken along a line IX-IX in FIG. 7) of the vehicle lamp.

A vehicle lamp 1 of the second embodiment is similar to the vehicle lamp 1 of the first embodiment except for a configuration in which headlamp light distribution patterns are formed by, in place of the light source unit 20 and the laser scanning unit 30 of the first embodiment, a light source unit 200, a light source unit 100Hi having a laser scanning unit 300 and a light source unit 100Lo. Like reference numerals will be given to like configurations to those of the first embodiment, and a detailed description thereof will be omitted here.

As will be described later, the vehicle lamp 1 of the second embodiment has the light source 200 that shines a laser beam and the light source unit (100Hi) having a light emitting portion (a luminous light emitting member 500) that emits light by receiving a laser beam from the light source unit 200, the laser scanning unit 300 having a single or plurality of acousto-optic devices that is disposed between the light source unit 200 and the light emitting portion 500 and which scans to the light emitting portion 500 the laser beam from the light source unit 200, and a projection lens 600 that is disposed in front of the light emitting portion 500. In addition to these constituent parts, the light source unit 100Lo, a vertical bracket 7a, an extension 8 and aiming screws 9 are also provided win a lamp compartment of the vehicle lamp 1.

The light source unit 100Lo is a so-called projector type light source unit and forms a low beam light distribution pattern PL. The light source unit 100Lo has an LED light source 71, a reflector 72, a shade 73 and a projection lens 74. An optical axis of the LED light source 71 is directed to the top of the lamp. The reflector 72 has a reflecting surface whose basic shape is based on an ellipsoidal plane and covers over the LED light source 71 in a semi-spherical fashion. The reflector 72 is fixed to the shade 73 so that a first focal point coincides substantially with the LED light source 71. The shade 73 is fixed to the vertical bracket 7a and formed cut-off lines CL1 to CL3. The projection lens 74 is fixed to a distal end of the shade 73 so that the projection lens 74 is disposed on an optical axis of the light source unit 100Lo and a rear focal point of the projection lens 74 coincides substantially with a second focal point of the reflector 72. The light source unit 100Lo may take other configurations as long as predetermined low beam light distribution pattern PL is formed.

Next, the light source unit 100Hi will be described. The light source unit 200 has an ultraviolet laser diode 201 that emits an ultraviolet laser beam, a collective lens 202 and the like, is disposed so as to be oriented to the rear of the lamp and obliquely upwards so that the shining direction of a laser beam coincides with the luminous light emitting member 500, and is fixed to a predetermined light source mounting portion (not shown). FIGS. 7 to 9 shows an interior of the light source unit 200 as viewed through a casing thereof. A light source that is adopted in the light source unit 200 should be a light source that emits a blue or bluish violet laser beam.

The laser scanning unit 300 has a first AO device 10A and a second AO device 10B. These AO devices are disposed in series in the order of the second AO device 10B and the first AO device 10A on an optical path L2 of a laser beam that is outputted from the light source unit 200.

The second AO device 10B is disposed with an acousto-optic medium 11 made parallel to a laser optical path L2 so that diffraction light of an incident laser beam is diffused in a horizontal direction (directions indicated by arrows 1 and r in FIG. 9) on the laser optical path L2 and is fixed by a predetermined method. The first AO device 10A is disposed in such a way that the second AO device 10B is rotated through 90 degrees relative to the laser optical path L2. Namely, the first AO device 10A is disposed with an acousto-optic medium 11 made vertical to the laser optical path L2 so that diffraction light of an incident laser beam is diffused in a vertical direction (directions indicated by arrows u and d in FIG. 8) on the laser optical path L2 and is fixed by a predetermined method.

An ultraviolet laser beam incident on the second AO device 10B from the light source unit 200 is scanned in the directions indicated by the arrows 1 and r and is then incident on the first AO device 10A. The ultraviolet laser beam that is incident on the first AO device 10A is scanned in the directions indicated by the arrows u and d and is emitted to the luminous light emitting member 500, which will be described later. A rectangular scanning area SA that is obtained in the laser scanning unit 300 is set so as to coincide with a position where luminescent elements 501 of the luminous light emitting member 500 are disposed.

The luminous light emitting member 500 has a plurality of luminescent elements 501, a heat dissipating substrate 502 where the luminescent elements 501 are mounted and a shading frame body 503. The luminous light emitting member 500 is fixed to a front surface of the vertical bracket 7a in a position, which will be described later.

The plurality of luminescent elements 501 are formed by dividing a single luminescent ceramic by the shading frame body 503, and the luminescent ceramic is divided into two rows that are aligned in a vertical direction and a plurality of (nine in this embodiment) columns that are aligned side by side in a horizontal direction. The luminescent ceramic is obtained by sintering a ceramic material that includes a red luminous light emitting element that converts, for example, the waveform of an ultraviolet laser beam into red light, a green luminous light emitting element that converts the waveform of the ultraviolet laser beam into green light and a blue luminous light emitting element that converts the waveform of the ultraviolet laser beam into blue light. The shading frame body 503 prevents light emitted from the individual luminous light emitting elements from being incident on the adjacent luminescent elements 501. The material of the luminescent element 501 is not limited to the ceramic, and hence, the luminescent element 501 may be formed of glass containing luminous light emitting materials or a transparent resin containing such luminous light emitting materials.

The projection lens 600 is an aspheric planoconvex lens for which a front plane is convex and a rear plane is flat or a biconvex lens and reverts a light source image formed on a plane at a rear focal point F of the projection lens 600 for projection ahead of the vehicle. The luminous light emitting member 500 is disposed so that a central portion of the luminescent elements 501 in a lower row is positioned below the rear focal point F and a central portion of the luminescent materials 501 in an upper row coincides substantially with the rear focal point F.

A control unit 40 has substantially the same configuration as that of the control unit 40 of the first embodiment Like reference numerals will be given to like configurations, and the description thereof will be omitted here. A light source control module 44 controls the light source unit 200. A scan control module 45 controls the laser scanning unit 300. The light source control module 44 controls the turning on and off of the ultraviolet laser diode 201. The scan control module 45 controls device by device independently frequencies that are oscillated in an alternating current oscillator 13 that is connected to the AO devices 10A, 10B of the laser scanning unit 300. A program in which the positions of the luminescent elements 501 are associated with scanning angles of the laser scanning unit 300 is stored in a ROM 42 in advance.

Figure 10:
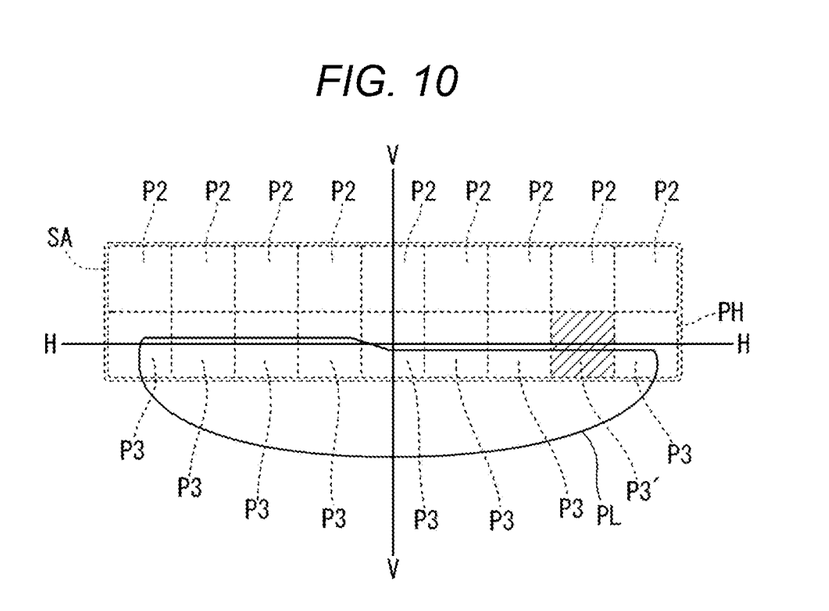
FIG. 10 shows an example of a headlamp light distribution pattern according to the second embodiment.

Headlamp light distribution patterns that are formed by the vehicle lamp 1 configured in the way described above will be described. FIG. 10 shows an example of a headlamp light distribution pattern according to the second embodiment and shows light distribution patterns that would be formed on an imaginary vertical screen disposed 25 meters ahead of the vehicle. The light source unit 100Lo forms a low beam light distribution pattern PL having a known shape made up of an oblique cut-off line CL3 and a horizontal cut-off line CL1 on the imaginary vertical screen.

The light source unit 100Hi forms a plurality of (nine in this embodiment) individual patterns P2 that are aligned in a horizontal direction in an area ranging from 6 degrees to 2 degrees above an H-H line and a plurality of (nine in this embodiment) individual patterns P3 that are aligned in the horizontal direction in an area ranging from 2 degrees above to 2 degrees (−2 degrees) below the H-H line, whereby the light source unit 100Hi can form a high beam light distribution pattern PH. The individual patterns P2 and P3 are projected images of the luminescent elements 501, and the individual patterns P2 correspond to the luminescent elements 501 in the lower row, while the individual patterns P3 correspond to the luminescent elements 501 in the upper row.

Specifically, as shown in FIG. 10, in the event that an oncoming vehicle or a pedestrian exists in a position that corresponds the a second individual pattern P3 from a right end in the high beam light distribution pattern PH (hereinafter, referred to as P3'), they are detected by an onboard camera 52 or a road monitoring camera 53, and position information is sent from an image processor 54 to a lamp ECU 41. In the lamp ECU 41, a luminescent element 501 that forms an individual pattern in a position that corresponds to the position information is identified, and a scanning angle of the laser scanning unit 300 that corresponds to the position information is also identified.

When the scanning position of the laser scanning unit 300 lies within areas of luminescent elements 501 that correspond to the divisions other than that of the individual pattern P3', the control unit 40 controls so that the light source unit 200 emits an ultraviolet laser beam, whereas the scanning position of the laser scanning unit 300 lies in an area of the luminescent element 501 that corresponds to the individual pattern P3', the control unit 40 controls so that the output of the light source unit 200 is stopped. This can form a headlamp light distribution pattern having a so-called ADB (Adaptive Driving Beam) function.

Namely, according to the vehicle lamp 1 of the second embodiment, the ABD function in which an ON and OFF control is executed at high speeds to provide a high visibility can be realized in the area where the high beam light distribution pattern is formed without involving any mechanical system by combining the turning on and off of the light source unit 200 that outputs the ultraviolet laser beam, the light deflection by the laser scanning unit 300 that includes the plurality of AO devices 10A, 10B and the luminous light emission by exciting the luminescent elements 501. Then, since the OA devices 10A, 10B are used as the laser scanning unit 300, even though vibrations and impacts are generated in a motor vehicle, the accuracy of the shining angle the laser scanning unit 300 can be maintained. In addition, the optical path length of the laser beam that is emitted from the light source unit 200 can be changed individually at the first AO device 10A and the second AO device 10B, and therefore, the generation of speckle noise in the vehicle lamp 1 is suppressed in an ensured fashion.

In the embodiments, it is preferable that a reflection preventive film is coated individually on surfaces 15 of the AO devices 10A, 10B, 10C (refer to FIG. 4) so as to reduce the surface reflection to thereby promote the transmission of the laser beam into the acousto-optic medium 11.

In addition, in the embodiments, it is preferable that the control unit 40 has a fail safe function at the scan control module 45 so that the laser beam is emitted appropriately. For example, when a signal from the air bag signal detecting mechanism 57 is detected as a result of an occurrence of an accident, the control unit 40 controls so that the frequencies that are inputted into the AO devices 10A, 10B, 10C are changed so as to cut off the laser beam. When a signal from the human sensor 58 is detected, the control unit 40 controls so that the frequencies that are inputted into the AO devices 10A, 10B, 10C are changed to reduce the intensity of the laser beam so that the laser beam becomes, for example, a laser beam of a lower class that is specified under JISC 6802 that governs the "Emission Safety Standards for Laser Products" under the Japanese Industrial Standards or lower.

In the embodiments, from the viewpoint of achieving the two-dimensional illumination, the laser scanning unit 30 (the laser scanning unit 300) should have at least one AO device that diffuses the laser beam in the vertical direction and one AO device that diffuses the laser beam in the horizontal direction that are disposed on the laser optical path in a disordered fashion. Namely, at least two AO devices 10 may be disposed in series on the laser optical path in such a state that the AO devices 10 are rotated through 90 degrees relative to each other.

Although there is a limit on the range where a laser beam is refracted by one AO device 10, in case a plurality of AO devices are disposed on an optical path of incident light in the same position so as to overlap each other in series, light that passes through one AO device 10 is refracted again by another AO device 10 that is disposed ahead of the one AO device 10, and therefore, the scanning range is expanded in the one direction in which the AO devices are overlapped. Consequently, in the event that the headlamp light distribution patterns are formed by the light source unit 20 and the laser scanning unit 30, it is preferable in consideration of the fact that the headlamp light distribution patterns are designed so as to be elongated horizontally in the vehicle's width direction that the laser scanning unit 30 is configured so as to diffuse the laser beam well in the horizontal direction. An example of this configuration is represented by the configuration of the first embodiment in which firstly, the first AO device 10-A that diffuses the laser beam in the vertical direction is disposed on the laser optical path L1 of the light source unit 20, and the plurality of second AO devices 10B, 10C that diffuse the laser beam in the horizontal direction are disposed ahead of the first AO device 10A so as to overlap the first AO device 10A.

However, there should be various modified examples in relation to the number of AO devices 10 that the laser scanning unit 30 includes and the order in which the AO devices 10 are disposed. Namely, a configuration may be adopted in which a single AO device 10 is used or in which the number of AO devices that diffuse the laser beam in the vertical direction is greater than the number of AO devices that diffuse the laser beam in the horizontal direction.

The present invention has been described in detail and by reference to the specific embodiments. However, it is obvious to those skilled in the art to which the present invention pertains that various alterations and/or modifications can be made thereto without departing from the spirit and scope of the present invention.

This patent application is based on Japanese Patent Application No. 2014-084816 filed on Apr. 16, 2014, the contents of which are incorporated herein by reference.

The invention claimed is:

1. A vehicle lamp comprising:
   a laser scanning unit including a plurality of acousto-optic devices;
   a light source that shines a laser beam incident on the plurality of acousto-optic devices; and
   a control unit configured to control the laser scanning unit,
   wherein the control unit controls the laser scanning unit so as to modify, on the basis of an electric signal, an angle at which the laser beam incident on the plurality of acousto-optic devices is deflected,
   wherein the plurality of acousto-optic devices includes at least two first acousto-optic devices that diffuse the laser beam in a horizontal direction and at least one second acousto-optic device that diffuses the laser beam in a vertical direction,
   wherein the plurality of acousto-optic devices includes more first acousto-optic devices that diffuse the laser beam in a horizontal direction than second acousto-optic devices that diffuse the laser beam in a vertical direction,
   wherein the vehicle lamp is configured to display a low-beam light distribution pattern and a high-beam light distribution pattern for illuminating a front of the vehicle,
   wherein the laser scanning unit is configured to modify the angle at which the laser beam incident on the plurality of acousto-optic devices is deflected, so as to emit light within a rectangular scanning area that is wider than the low-beam light distribution pattern and the high-beam light distribution pattern, and
   wherein the at least two first acousto-optic devices and the at least one second acousto-optic devices are disposed so as to overlap each other in series on an optical path of the laser beam.

2. The vehicle lamp according to claim 1,
   wherein the at least two first acousto-optic devices and the at least one second acousto-optic device are disposed in such a state that the at least two first acousto-optic devices and the at least one second acousto-optic device are rotated 90degrees relative to each other and the optical path of the laser beam.

3. The vehicle lamp according to claim 1, the vehicle lamp further comprising:
   a luminous light emitting member that includes a luminescent element that is excited by a shining of the laser beam, and
   wherein the light source shines the laser beam to the luminescent element.

4. The vehicle lamp according to claim 3, wherein
   the luminous light emitting member includes a shading body frame and a heat dissipating substrate, and
   the luminous element is configured as a plurality of individual luminous elements.

5. The vehicle lamp according to claim 4, wherein
   the plurality of individual luminous elements is arranged in rows and columns.

6. The vehicle lamp according to claim 1, wherein
   the control unit is further configured to slow a scanning speed of the laser scanning unit according to a designed luminous intensity.

7. The vehicle lamp according to claim 1, wherein the control unit is further configured to control the laser scanning unit such that the laser beam is deflected so as to project a figure, symbol, or character on a road surface or a structure on a periphery of the vehicle.

8. The vehicle lamp according to claim 7, wherein the projected figure, symbol, or character includes at least one of a driving assist grid, a turn indicting mark, or vehicle width indication lines.

* * * * *